C. H. SMOOT.
ELASTIC FLUID PRESSURE MULTIPLIER.
APPLICATION FILED JUNE 22, 1920.

1,381,139.

Patented June 14, 1921.

INVENTOR.
Charles Head Smoot

UNITED STATES PATENT OFFICE.

CHARLES H. SMOOT, OF SOUTH ORANGE, NEW JERSEY, ASSIGNOR TO RATEAU BATTU SMOOT ENGINEERING CORPORATION, OF NEW YORK, N. Y., A CORPORATION OF DELAWARE.

ELASTIC-FLUID-PRESSURE MULTIPLIER.

1,381,139.      Specification of Letters Patent.    Patented June 14, 1921.

Application filed June 22, 1920. Serial No. 390,919.

*To all whom it may concern:*

Be it known that I, CHARLES H. SMOOT, a citizen of the United States, and resident of South Orange, State of New Jersey, have invented certain new and useful Improvements in Elastic-Fluid-Pressure Multipliers, of which the following is a specification.

My invention relates to means whereby a small pressure may be multiplied into a larger pressure with a constant ratio of multiplication and to maintain such pressure multiplication when elastic fluids are employed.

My apparatus is especially adapted to operate with elastic fluids. An apparatus which will properly function with water or other virtually incompressible fluid may be inoperative when handling elastic fluids; when an elastic fluid is brought to bear in such an apparatus a vibratory motion results, in which the moving element oscillates rapidly and the pressures fluctuate from high to low values for each oscillation in the moving element, with the result that the ratio between the high and the low pressure is upset and the multiplication from one pressure to another disappears.

The apparatus which I have invented obviates this difficulty and is so constructed as to be operative on elastic fluids, such as compressed gas or steam.

A second feature of my invention resides in a disposition which eliminates friction between moving and stationary parts interfering with the accuracy of the pressure multiplication.

My apparatus may be employed in conjunction with devices for the regulation of pressure or in connection with pressure gages for indicating pressures, volumes, etc. Its applications are obvious to those skilled in the art.

Fig. 1 shows my device employed as a flow meter; a pressure gage of conventional form attached to my apparatus indicates the volume of elastic fluid passing through the conduit to which the apparatus is attached.

Figures 1, 2:
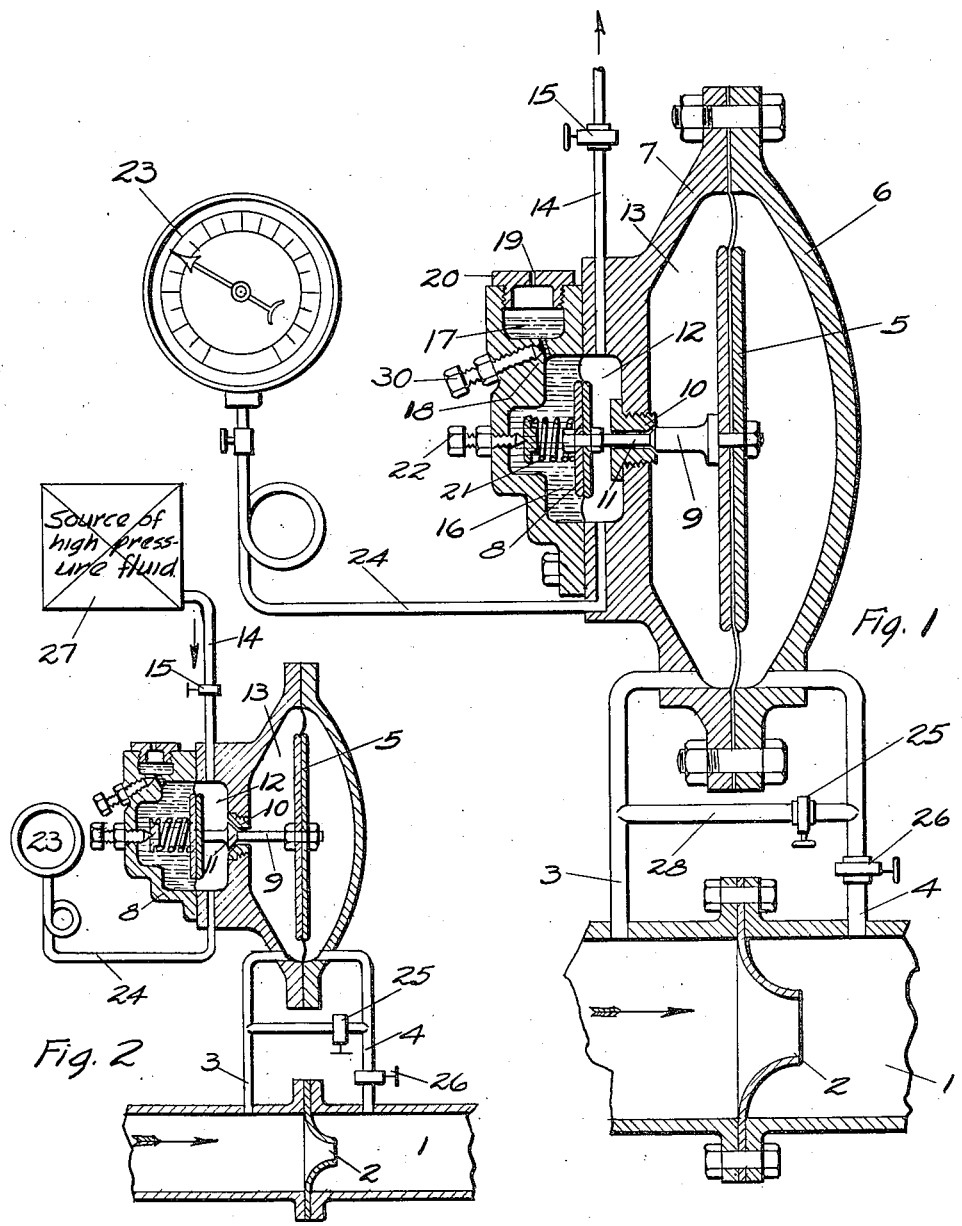
Figure 1 is a vertical cross section through one embodiment of my invention and Fig. 2 is a vertical cross section through a second embodiment of my invention.

In Fig. 1, 1 is a pipe through which a fluid such as steam is flowing. 2 is an orifice in a plate inserted in the pipe in such a way that the volume of fluid produces a pressure difference between pipes 3 and 4, which are connected to either side of flexible diaphragm 5, clamped between casing halves 6 and 7. Flexible diaphragm 8, usually of much smaller area than diaphragm 5, is rigidly bolted to diaphragm 5 by means of stem 9. Valve seat 10, attached to casing half 7, is provided with a beveled surface which forms, together with the shoulder on stem 9, a valve 11 controlling the passage of elastic fluid. 12 is a chamber in communication with chamber 13 through valve 11. 14 is a pipe provided with adjustable valve 15, which opens to atmosphere, and the orifice of opening is controlled by the opening of valve 15. 16 is a chamber to the left of the diaphragm 8, which is filled with a virtually non-compressible fluid, such as oil, and is in communication with chamber 17 through the adjustable orifice 18 controlled by screw 30. Chamber 17 is in communication with atmospheric pressure through the orifice 19 in the cover 20. 21 is a coil spring, whose compression may be adjusted by means of adjusting screw 22. 23 is a pressure gage in communication with chamber 12 through piping 24. Pipe 28, controlled by valve 25, is a by pass between pipes 3 and 4.

Fig. 2 shows a similar arrangement, but suitable for use when the pressure in pipes 3 and 4 is low and it is desired to have a higher pressure for actuating gage 23.

In Fig. 2 the same symbols are used to name parts corresponding to parts shown in Fig. 1. 27 is a source of high pressure fluid under control of hand valve 15 in pipe 24, which is in communication with chamber 12 and admits a steady flow of high pressure fluid to chamber 12. The shoulder on stem 9, in conjunction with valve seat 10, forms valve 11. Stem 9 is rigidly attached to diaphragm 8 and diaphragm 5.

The operation of the apparatus shown in Fig. 1 is as follows:

When high pressure elastic fluid, such as steam, is passing through orifice 2, a pressure difference between fluid in pipes 3 and 4 is produced, which pressure difference bears on diaphragm 5, creating a force acting in a righthand direction. High pressure steam passes through pipe 3 into chamber 13 through valve 11 into chamber 12 and escapes to atmosphere through valve 15. The pressure in chamber 12 exerts a force on diaphragm 8, acting in a lefthand direction. When diaphragms 5 and 8 are not in motion the right and left hand forces are equal to each other and the pressure in chamber 12 is in proportion to the pressure difference across diaphragm 5 because of balance in total forces between diaphragms 8 and 5. The function of chamber 16, which is filled with fluid such as oil, is to provide a suitable compensator which permits the multiplication of pressure to be maintained without the disturbances incidental to vibrations. Any motion of valve 11, rigidly attached to diaphragms 5 and 8, necessitates a displacement of the viscous fluid in chamber 16 through the orifice 18 and the rate of fluid flow through orifice 18 determines the velocity at which diaphragms 5 and 8 can move to right or left under the impulsion of unbalanced pressures. The motion of these diaphragms in practice is very minute and seldom exceeds 1/1000″. This minute displacement, however, must be accompanied by a flow of viscous fluid through orifice 18 and owing to the small size of this orifice the most minute motion of diaphragms 5 and 8 can be suitably retarded and made sufficiently slow to prevent over-closure or over-opening of valve 11, the over-travel of valve 11 being the seat and cause of the destructive vibration. During a motion of diaphragms 5 and 8, the pressure multiplying ratio between chambers 12 and 13 is interfered with by the momentary changes of pressure in chamber 16, which interference is gradually removed by the flow of fluid past orifice 18, whereby equilibrium is restored and the normal pressure ratio maintained.

It will be seen that the retarding action due to displacement of liquid in chamber 16 is obtained without the leakage and friction losses occurring in the dashpots employed in the art.

By means of the adjusting screw 22 and coil spring 21 an initial pressure in chamber 12 may be adjusted to the value desired in such a way that this pressure has a definite value when there is no pressure difference across diaphragm 5, so that gage 23, which indicates the pressure in chamber 12, will have a definite and adjustable zero reading, from which point upward it will indicate the pressure difference between pipes 3 and 4 multiplied by the ratio of areas of diaphragms 5 over 8. The pressure in chamber 12 is maintained an accurate measure of the pressure difference across diaphragm 5 by the elimination of stuffing boxes or other friction producing elements bearing on diaphragms 5 and 8 and the connecting stem 9. The disposition of the apparatus is such that with vibration eliminated stem 9 is not in metallic contact with valve seat 10 and at no other point is in contact with stationary material, and consequently there is no friction opposing the motion of diaphragms 5 and 8 to vary the opening of valve 11. As result the pressure ratio between the pressure of chamber 12 and the pressure difference across diaphragm 5 does not depart from the numerical ratio established by their relative areas. The adjustment of the zero pressure in chamber 12 can always be made by closing valve 26 and opening valve 25. This places an equal pressure on either side of diaphragm 5, but allows the flow of steam through pipe 3 to chamber 13, whereby the pressure in chamber 12 is maintained at the value desired.

The operation of the second embodiment of my invention, shown in Fig. 2, is as follows:

High pressure elastic fluid delivered by source 27 passes through pipe 14, the flow being controlled by valve 15, which acts as a restricted orifice. The pressure of the elastic fluid acts on diaphragm 8 and is controlled by displacement of valve 11. The leakage of fluid through valve 11 is disposed of through chamber 13 and pipe 3, this amount of leakage being so small that it can have no effect on pressure drop in pipe 3.

I do not wish to be limited to a beveled valve seat for valve 11, as in practice I have used a valve with a flat seat with good result. I attach great importance to the fact that valve 11 is frictionless in its operation of controlling the size of orifice for the flow of elastic fluid from chamber 13 to chamber 12 in Fig. 1 and from chamber 12 to chamber 13 in Fig. 2.

It will be seen that valve 11 floats on its seat and that all metal to metal contact is eliminated in its action.

Combination of coil spring 21 and screw 22 must be considered as one form of embodiment of means to load diaphragm 8 to any predetermined value; means other than a spring device, such as weights, are well known in the art.

Diaphragm 8 is subjected to the escaping fluid passing through the variable orifice created by valve 11 on one side; on the other side diaphragm 8 constitutes a flexible wall for chamber 16, the displacement of the liquid contained in said chamber 16 being controlled directly by the flexion and deflection of the flexible wall, valve 18 in turn controlling length of time for said displacement of the liquid.

I claim:—

1. In an elastic fluid pressure multiplier two diaphragms rigidly interconnected, the first diaphragm being subjected to the difference of pressure of the flow of fluid passing through an orifice interposed in the path of its travel, the second diaphragm being subjected to the pressure of the fluid passing through a valve operated by the displacement of the first diaphragm, and a chamber having a flexible wall constituted by the second diaphragm and containing a liquid.

2. In an elastic fluid pressure multiplier two diaphragms rigidly interconnected, the first diaphragm being subjected to the difference of pressure of the flow of fluid passing through an orifice interposed in the path of its travel, the second diaphragm being subjected to the pressure of the elastic fluid passing through a valve operated by the displacement of the first diaphragm, a chamber having a flexible wall constituted by the second diaphragm containing a liquid and an outlet in said chamber communicating to a second chamber in which the pressure is maintained substantially constant.

3. In an elastic fluid pressure multiplier two diaphragms rigidly interconnected, the first diaphragm being subjected to the difference of pressure of the flow of fluid passing through an orifice interposed in the path of its travel, the second diaphragm being subjected to the pressure of a fluid passing through a valve operated by the displacement of the first diaphragm, means to allow the fluid operating said second diaphragm to escape and a chamber having a flexible wall constituted by the second diaphragm and containing a liquid.

4. In an elastic fluid pressure multiplier two diaphragms interconnected the first diaphragm being subjected to the difference of pressure of the flow of fluid passing through an orifice interposed in the path of its travel and the second diaphragm subjected to the pressure of a fluid controlled by a valve operated by the first diaphragm.

5. In an elastic fluid pressure multiplier two diaphragms interconnected the first diaphragm being subjected to the difference of pressure of the flow of fluid passing through an orifice interposed in the path of its travel and a second diaphragm subjected to the pressure of a fluid controlled by a valve operated by the first diaphragm and adjustable means to bring the apparatus to the predetermined zero pressure.

6. In a fluid pressure multiplier two diaphragms interconnected, the first diaphragm being subjected to the difference of pressure of the flow of fluid passing through an orifice interposed in the path of its travel, and the second diaphragm subjected to the pressure of a fluid controlled by a valve operated by the first diaphragm and connected to a liquid compensator.

CHARLES H. SMOOT.